June 5, 1923.  1,458,044
W. W. FORD
PEANUT HARVESTER
Filed Jan. 10, 1920  5 Sheets-Sheet 1
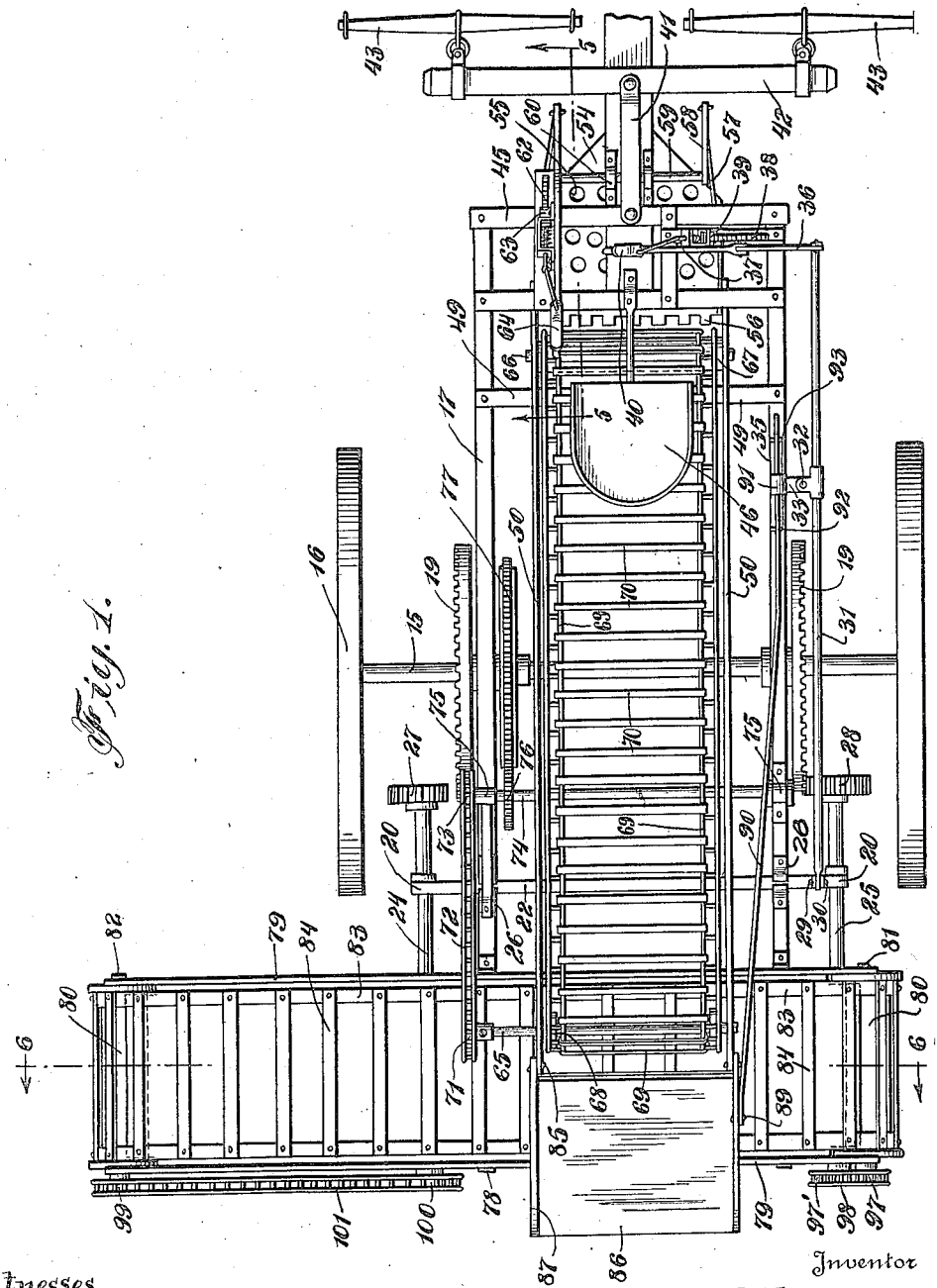

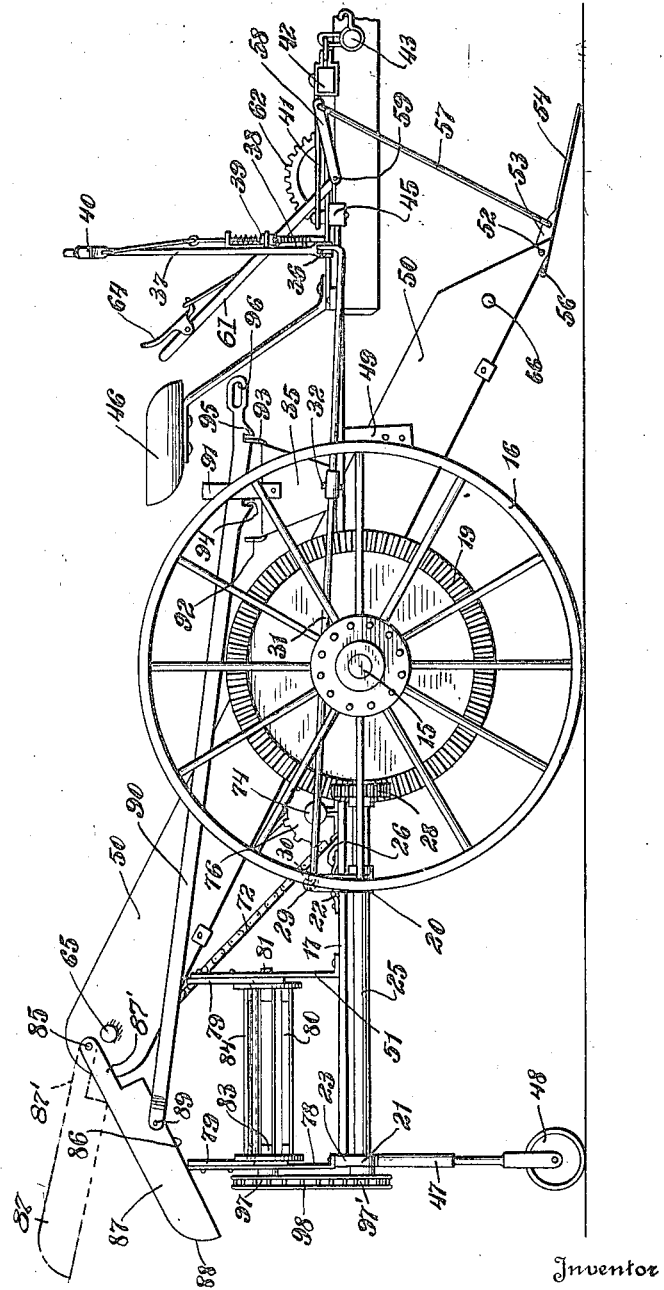

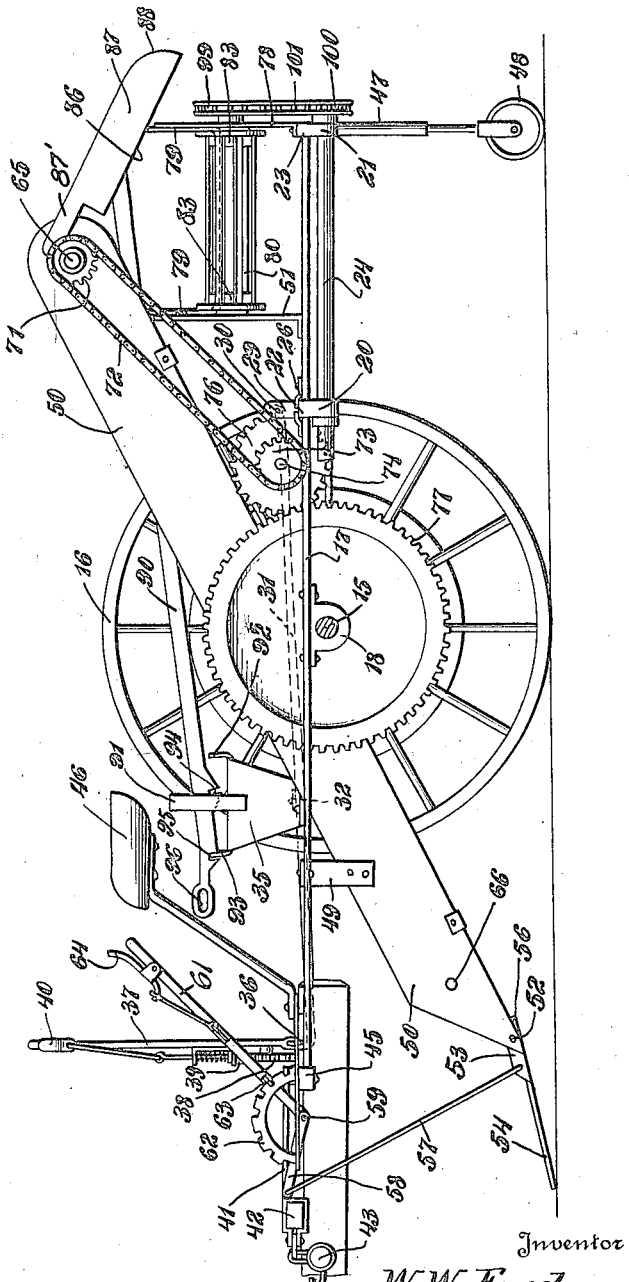

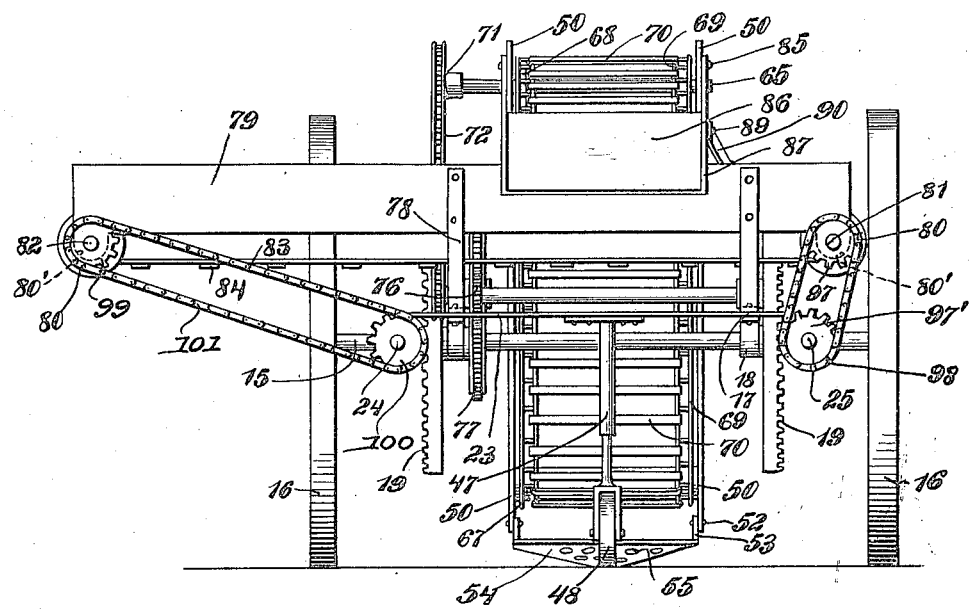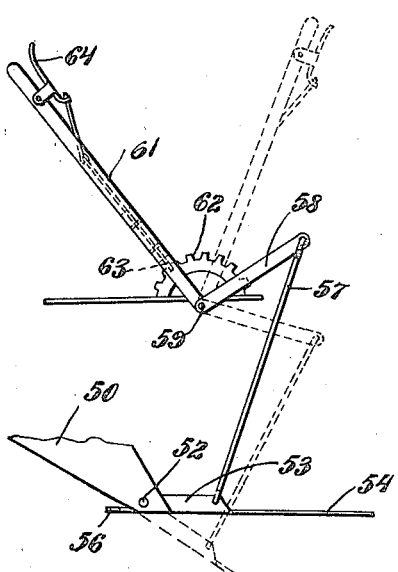

June 5, 1923.
W. W. FORD
PEANUT HARVESTER
Filed Jan. 10, 1920
1,458,044
5 Sheets-Sheet 5
Fig. 6.
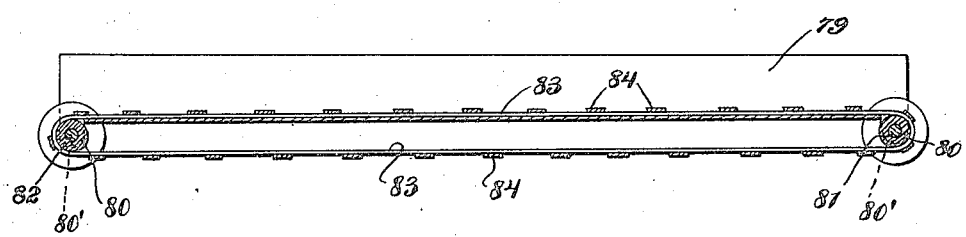
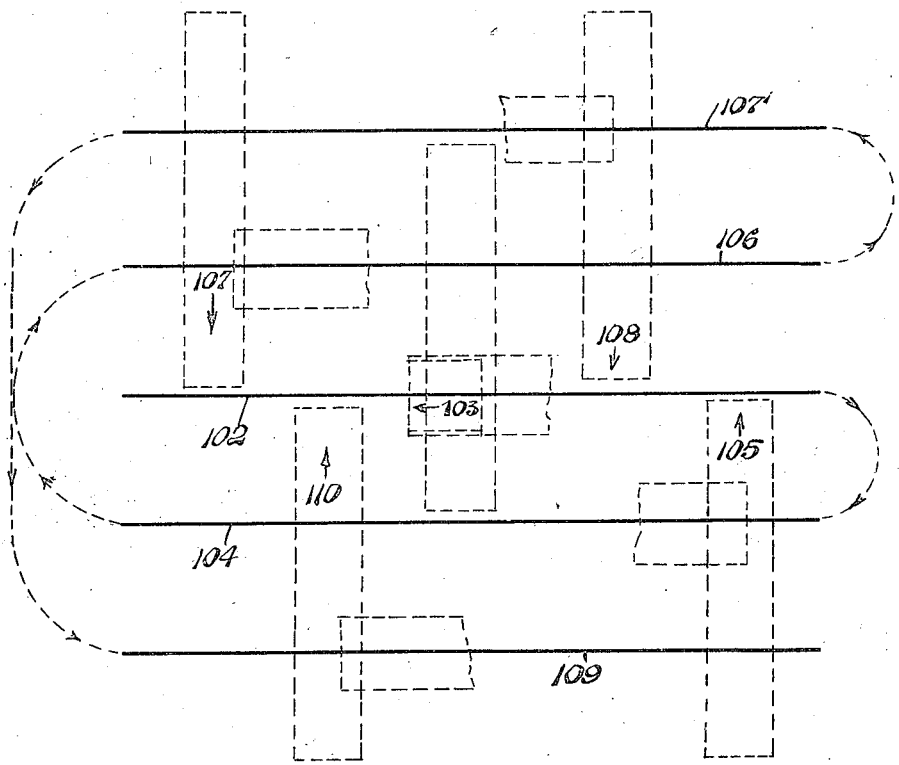
Fig. 7.
Witnesses
Benj Kahn
Inventor
W. W. Ford
By Victor J. Evans
Attorney Patented June 5, 1923.

1,458,044

UNITED STATES PATENT OFFICE.

WILLIAM W. FORD, OF AVINGER, TEXAS.

PEANUT HARVESTER.

Application filed January 10, 1920. Serial No. 350,659.

*To all whom it may concern:*

Be it known that I, WILLIAM W. FORD, a citizen of the United States, residing at Avinger, in the county of Cass and State of Texas, have invented new and useful Improvements in Peanut Harvesters, of which the following is a specification.

This invention relates to improvements in peanut harvesters.

In the present method of harvesting peanuts the vines are dug from the rows in which they have been planted and generally deposited directly in the furrows made by the shovel or share. As a consequence the nuts are not properly aerated and frequently rot on the vine. In addition to this, a considerable amount of time is required by the gatherers in travelling over each separate furrow to gather the vines. It may be considered the primary object of the invention to produce a peanut harvester whereby the nuts and vines harvested from at least five rows of vines will, in the process of harvesting, be all deposited in a single windrow.

A further object of the invention is to produce a harvester of this character which is of a simple and durable construction, including at the front thereof an adjustable share that communicates with an endless slatted elevator over which the vines pass and in their passage are relieved from sand and dirt, thus partially separating the peanut vines from such material, while at the rear of the device is a conveyor arranged transversely with respect to the elevator and susceptible to movement in either of two directions. Pivoted to the elevator is a directing chute designed to direct the vines and nuts dug by the shovel or share into the first furrow made thereby and thereafter designed to be raised above said conveyor to allow the vines and nuts to be deposited thereon and to be delivered therefrom to either side of the machine, all of the revoluble parts being operated by the traction wheels, and all of such revoluble parts being under the control of the operator.

Many other objects and advantages will present themselves to those skilled in the art to which this invention appertains as the nature of the invention is more fully described, reference being had to the accompanying drawings in which there is illustrated a simple and satisfactory exemplification of the invention reduced to practice, it being understood that the nature of the invention is such as to render the same susceptible to various changes and modifications, all of which, however, fall within the scope of what is claimed.

In the drawings:

Figure 1 is a top plan view of the improvement.

Figure 2 is a side elevation but showing the chute in dotted lines in elevated position to allow the vines and nuts to drop upon the delivery conveyor.

Figure 3 is a view looking toward the opposite side of the machine.

Figure 4 is a rear elevation.

Figure 5 is a sectional view approximately on the line 5—5 of Figure 1.

Figure 6 is a sectional view approximately on the line 6—6 of Figure 1.

Figure 7 is a diagrammatic view illustrating five rows of vines and the direction which the machine takes in harvesting and in depositing the harvested vines and nuts in the furrow or the row that provides the inner row.

On the drive axle 15 of my improved peanut harvester there are secured the ground wheels 16. If desired, the ground wheels may have their tread surfaces calked. On the axle 15 is a substantially rectangular frame 17. The axle extends a suitable distance beyond the sides of the frame. The frame may be constructed of angle irons if desired and is provided with depending bearings 18 for the anxle 15. Suitable collars, secured on the axle may be arranged at the opposite sides of the bearings 18 to hold the frame against lateral movement on the axle.

Keyed or otherwise secured on the axle 15 at the outer sides of the frame 17 are crown toothed wheels 19. Journaled in suitable bearings 20 and 21 respectively formed on the ends of bars 22 and 23 respectively are longitudinally extending shafts 24 and 25. The bar 23 carrying the bearings 21 is secured to the rear of the frame in a rigid manner, but the bar 22 carrying the bearings 20 is slidable through guideways 26 in the side members of the frame. The shafts 24 and 25 have on their inner ends pinions 27 and 28 respectively, and it will be apparent that by sliding the bar 22 either the pinion 27 or 28 will be brought in mesh with one of the crown toothed wheels 19. On the slidable bar, adjacent one of the bearings 20 is an upstanding lug 29. To this lug is pivotally connected, as at 30 a rod 31 that extends longitudinally of the frame 17, being, of course, disposed outward of one side of the frame. This bar terminates adjacent to the front of the frame, but is pivoted off of its center, as at 32, to an outstanding lug 33 formed on an upstanding bracket 35 that is secured on one of the side members of the substantially rectangular frame 17. The free end of the rod 31 is connected through the medium of a pivoted link 36 to a lever 37. This lever is pivoted to a toothed segment 38 that is arranged at the front of the frame. The teeth of the segment are engaged by a spring influenced dog 39 arranged in suitable bearing brackets on the lever, the said dog being connected by suitable rods or links to an operating handle 40 which is also pivoted to the lever, and it will be apparent that by operating the handle the dog will be drawn out of engagement with the teeth of the segment and by swinging the lever the rod 31 will be swung on its pivotal connection with the lug 30 to slide the bar 22 to bring either of the pinions 27 or 28 in engagement with one of the crown toothed wheels 19.

Secured to the frame at the front thereof is a tongue 41. Pivotally connected to this tongue in the usual manner is an evener bar 42 carrying trees 43 to which the draft animals are attached. The tongue 41 extends a suitable distance inward of the frame having its inner end secured to a cross bar 45 that connects the side bars of the frame inward of the front end bar and to this cross bar is secured the arched spring member that supports the seat 46.

To the rear of the frame is secured a depending standard or post 47 having a lower bifurcated end through which is journaled the shaft that supports the guide wheel 48.

Depending from the front of the frame and arranged at an inward inclination are supports 49 for the front of the side members 50 of the endless elevator. The side members 50 are arranged at an upward inclination with respect to the frame, being supported thereon by suitable brace members 51 connected to the sides of the frame. The said side members of the elevator have pivotally secured, as at 52 at their outer and lower ends the flanged sides 53 of the shovel or share 54. The shovel has its outer end pointed and is provided with spaced perforations 55 and has its inner edge formed with outstanding tines 56. To the flanged sides 53 of shovel are connected upstanding links 57. These links are loosely connected to arms 58 formed on the ends of a shaft 59. The shaft is centrally journaled in suitable bearing 60 on either the front of the frame or on the tongue and secured to the shaft at one of the ends thereof is a lever 61. To one side of the lever is a toothed segment 62, and carried by the lever is a spring pressed dog 63 that engages between the teeth of the segment, the said dog being connected by links to a handle 64 that is pivoted to the lever, and a pressure upon this handle will bring the dog out of engagement from between the teeth of the segment and permit the lever to be swung to rock the shaft and through the medium of the arms thereof and the links connected with the shovel raise or lower the shovel as desired. By reference to the drawings it will be noted that the levers which control the shovel and which control the pinions are disposed at the opposite sides of the seat 46 and are in close proximity to the occupant of the seat.

Between the side plates 50 for the endless elevator there are journaled at the top and at the bottom thereof shafts 65 and 66 respectively. On the lower shaft there is secured a drum 67, while on the upper shaft, inward of the side members of the elevator are sprocket wheels 68. Around the sprocket wheels and around the drum there are trained endless chains 69 to which are connected transversely arranged slats 70, the said slats being suitably spaced so that the vines and nuts delivered thereto by the shovel will, while being elevated, be sufficiently agitated to remove therefrom sand, dirt and other foreign accumulation. The shaft 65 has one of its ends projecting a suitable distance beyond one of the side plates of the elevator and on the outer end thereof there is secured a sprocket wheel 71. Around this sprocket wheel is trained an endless chain 72 which is also trained over a sprocket wheel 73 that has its shaft 74 journaled in suitable upstanding bearings 75 supported by the side members of the frame 17. The shaft is provided with suitable collars or sleeves to hold the same against lateral movement. On the shaft 74 there is keyed or otherwise secured a toothed wheel 76 which meshes with a larger toothed wheel 77 that is keyed or otherwise secured to the drive axle 15. It will thus be apparent that when the device is propelled the elevator will be operated continuously in an upward direction.

Supported by suitable uprights 78 on the frame 17 are the side plates 79 of the conveyor or directing means for distributing the nuts and vines to the sides of the machine. Between the ends of the side plates 79 are arranged drums 80 that have short shafts or trunnions passing through bearing openings in depending brackets 80' on the ends of the plates. For distinction the trunnion or shaft projecting outwardly and rearwardly from one of the drums through the outer bracket is indicated by the numeral 81 and the other likewise extending shaft is indicated by the numeral 82.

Around the drums there is trained the endless conveyor which comprises flexible side members 83 and transverse slats 84 connecting said flexible members.

On the outer plate of the elevator there is pivotally secured, as at 85 a chute 86. This chute is disposed directly opposite the delivery end of the elevator and comprises a member of a width approximately equalling that of the elevator, the said member having its sides flanged as at 87 and the said member is preferably cut out from its inner end providing arms 87' in a line with the flanges, and the rear portions of the flanges are rounded outwardly as at 88. The ends of the side members of the elevator are designed to be received in the cut out portion of the chute when the chute is lowered upon its pivot against the said conveyor. To one of the side members or flanges 87 of the chute is pivotally secured, as at 89, a rod 90. This rod passes through a suitable guide 91 on the top of the bracket 35. The bracket has its top portion flat and is provided at its ends with upstanding members or lugs 92 and 93 respectively. The rod 90, adjacent to the free end thereof is widened upon its lower edge and the said widened portion is provided with two spaced angularly disposed slots 94 and 95, and the said rod outward of the said widened portion is formed with a handle member 96 that is disposed at one side of the seat 46. It will be apparent that by grasping the handle the operator may bring the slot 95 to engage with the lug 93 to hold the chute in receiving position with respect to the elevator. By forcing the rod rearwardly, bringing either the slots 94 or 95 in engagement with the lug 92 the chute may be raised above the delivery conveyor out of receiving position and permit the vines and nuts to fall upon the conveyor through the opening provided by the cut out portion of the chute.

By referring to the drawings it will be noted that the conveyor is of a length equaling four rows of plants, but is so arranged on the frame that the distance between one of the ends thereof, and the elevator is equal to the distance between the two rows of plants while the other end is disposed away from the elevator a distance equaling three rows of plants. On the shaft 81, which is at the short end of the conveyor, there is a sprocket wheel 97. On the end of the longitudinal shaft 25 there is a similar sprocket wheel 97'. Around these sprocket wheels is trained an endless chain 98. On the second shaft 82 at the opposite end of the conveyor there is secured a sprocket wheel 99. On the outer end of a shaft 24 is a similar sprocket wheel 100. Around the sprocket wheels 99 and 100 is trained a chain 101. Reference is now to be had to Figure 7 of the drawings. The central row of plants is the windrow. For distinction this row is indicated by 102. The chute is lowered against the rear end of the conveyor and the shovel is properly adjusted so that the row will be dug and the plants will travel over the shovel and over the elevator to be disposed by said chute in the windrow or travel of the elevator, as indicated by the arrow 103, upon reaching the end of the windrow the machine is turned to the right in a position to operate upon a second row of plants indicated by the numeral 104. The lever is operated to swing the shafts 24 and 25 so that the pinion 28 on the shaft 25 will be brought into mesh with the crown wheel 19 adjacent thereto which moves the conveyor in the direction of what I have termed the short end of the conveyor. The conveyor travels in the direction of the arrows 105, the shovel digging the plants, and the same being raised to the elevator on to the conveyor and then disposed on the windrow 102. When the machine is at the end of the row 104 it is turned to the right, the shovel being lifted so that the same is positioned to dig the plants in one of the upper rows which may be indicated by the numeral 106. The shovel is properly engaged to dig the plants and the conveyor is moved in the direction of the arrow 107. This causes the plants and nuts to be raised from the elevator on to the conveyor to be disposed in the windrow 102. The shovel is again lifted and the machine brought to aline with the row of plants indicated in the diagram by the numeral 107'. The lever is again operated for swinging the shafts 24 and 25 so that the sprocket combination 27 is brought into mesh with the second crown wheel 19. This reverses the direction of movement of the conveyor so that the long end of the conveyor is brought next to the windrow 102; and the shovel being brought to operative position, the conveyor traveling in the direction of the arrow 108 will dispose of the plants and nuts on the windrow 102. At the end of the row 107' the machine is turned to the left so that the same is in a line with the second outer row of plants indicated by the numeral 109. The conveyor will move in the direction of the arrow 110. The shovel will dig the plants and the elevator will lift the same and dispose of the plants on the conveyor which will deliver them to the windrow.

By the construction of the elevator and the conveyor, the said plants will be thoroughly shaken when traveling over the same so that the dirt and the foreign matter will be removed therefrom. Around the several rows dug and upon the windrow the plants and nuts will be properly aerated, and it is thought from the foregoing description when taken in connection with the accompanying drawings that the construction and operation of the matter will be provided without further details of description.

Having now described and ascertained the nature of my invention, what I claim as new is:

In a peanut harvester, a wheeled frame, an inclined endless elevator supported thereby and operated by the wheels of the frame, a shovel at the forward end of the elevator, a conveyor arranged right angularly with respect to the elevator, disposed therebeneath and supported at the rear of the frame, said conveyor having one of its ends disposed a further distance away from the elevator than its other end, means operated by the wheels of the frame for imparting motion to the conveyor in either of two directions, means controlling the direction of travel of the conveyor, a chute having a cut-out portion to provide projecting sides which are hingedly supported on the frame of the elevator and whereby nuts and vines raised by the elevator may be delivered through the said cut-out portion of the chute on to the conveyor, means supporting the chute in such position, and means for swinging the chute to a downward inclination to receive thereon the nuts and vines from the elevator to deliver said nuts and vines to the rear of the conveyor, and means sustaining the conveyor in such position.

In testimony whereof I affix my signature.

WILLIAM W. FORD.